Feb. 10, 1959     J. P. FRANCIS     2,873,007

FASTENING DEVICE

Filed Feb. 10, 1955

INVENTOR
JOHN P. FRANCIS
BY
ATTORNEYS ved Feb. 10, 1959

2,873,007

FASTENING DEVICE

John P. Francis, Haverhill, Mass.

Application February 10, 1955, Serial No. 487,477

17 Claims. (Cl. 189—36)

(Granted under Title 35, U. S. Code (1952), sec. 266)

The invention described herein may be manufactured and used by or for the Government of the United States of America for governmental purposes without the payment of any royalties thereon or therefor.

This invention relates to fastening devices, and more particularly, to detachable fastening devices which are adapted to secure two or more members which are accessible from only one side.

It is an object of this invention to provide a fastening device which positively locks parts together.

It is a further object of this invention to provide a fastening device which is quickly and easily locked and unlocked.

It is a still further object of this invention to provide a fastening device which is simple in construction and operation.

Other objects and many of the attendant advantages of this invention will be readily appreciated as the same becomes better understood by reference to the following detailed description when considered in connection with the accompanying drawings wherein.

Figure 1:
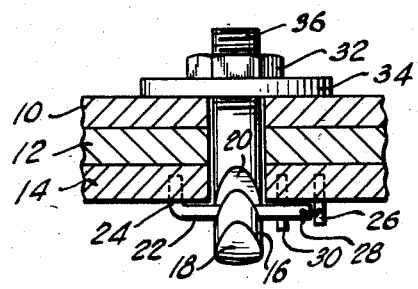
Fig. 1 is an elevation and sectional view of a fastening device employing the principles of this invention.

Referring now to Fig. 1, two or more plates, such as plates 10, 12, and 14, having holes therein located in cooperative relationship with respect to each other, are secured by bolt 16. The forward end 18 of bolt 16 is in the shape of a cam surface which is at an oblique angle with respect to the axis of bolt 16. Cut into bolt 16 is cam surfaced oblique groove 20 so that the inner end of the groove is offset from the entrance end of the groove, and hence the inner end of the grove is undercut with respect to its outer end. The inner end of the groove is nearer the oblique end 18 than is the entrance end of the groove. Both the cam surfaces of forward end 18 of bolt 16 and groove 20 are symmetrical about a given plane including the axis of bolt 16. Engaged by groove 20 is locking bar 22 (Fig. 4 also), which is pivotally mounted on plate 14 at point 24. The other end of locking bar 22 is connected by a tension spring 28 to pin 26 which is attached to plate 14. Pin 30, which is attached to plate 14, provides a stop for locking bar 22. Nut 32 and washer 34 on threaded end 36 of bolt 16 provides an adjustable head for bolt 16.

Referring now to the operation of the fastening device shown in Fig. 1, upon insertion of bolt 16 a slight pressure is applied to threaded end 36. This causes cam surfaced forward end 18 to rotate locking bar 22 outward against the tension of spring 28. When bolt 16 reaches the point where locking bar 22 is level with groove 20, locking bar 22 is moved into groove 20 by the tension of spring 28. The pressure on end 36 is then released. The cam surfaces of groove 20 and the tension of spring 28 cause locking bar 22 to move to the bottom of groove 20, positively locking bolt 16 against rotation. Nut 32 is then tightened, forcing washer 34 against plate 10.

To detach the fastening device, nut 32 is loosened, pressure is applied to threaded end 36, causing locking bar 22 to move up and out of groove 20; then bolt 16 is turned 90°, so that locking bar 22 cannot re-engage groove 20, and bolt 16 is removed.

Figure 2:
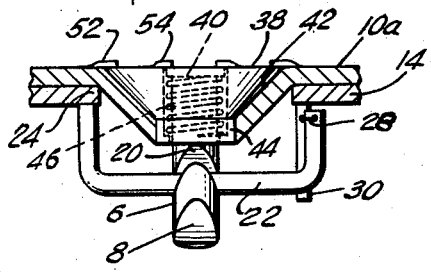
Fig. 2 is an elevation and sectional view of a preferred embodiment of a fastening device employing the principles of this invention.
Figure 2A:
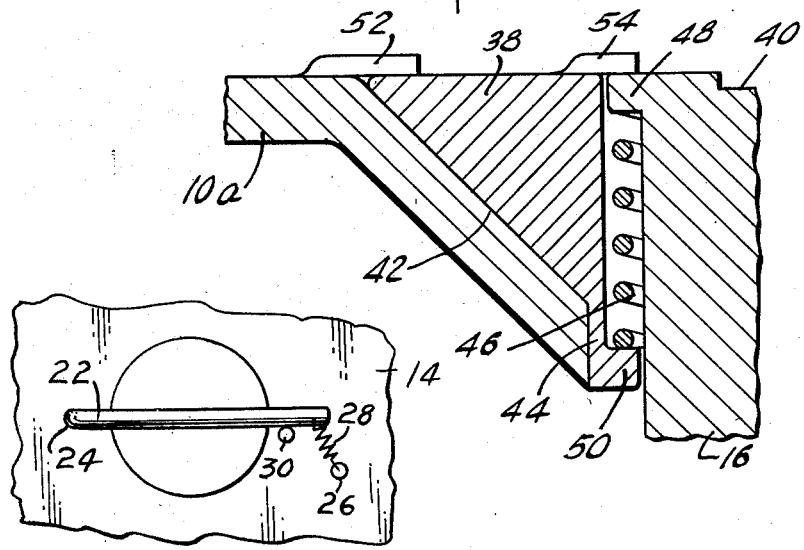
Fig. 2a is a detailed sectional view of a portion of the fastening device shown in Fig. 2.

Referring now to Figs. 2 and 2a, like reference numerals are used to identify like parts shown in Fig. 1. The fastening device shown in Figs. 2 and 2a is similar to the fastening device shown in Fig. 1, except that nut 32 and washer 34 are replaced by bevelled head 38, which is axially movable with respect to bolt 16.

Bevelled head 38 is provided with collar 44 at the lower extremity thereof and bolt 16 is provided with a screw-driver slot 40 on top thereof. Top plate 10a is bent to form recess 42 for receiving bevelled head 38, so that the top surface of bevelled head 38 is normally flush with the top surface of plate 10a. Spring 46, located between bolt 16 and bevelled head 38, is supported at one end by shoulder 48 on bolt 16 and at the other end by shoulder 50 on collar 44.

Tabs 52 and 54 may be provided, if desired, for retaining bevelled head 38 and bolt 16, respectively. However, these tabs may be omitted, in which case, bevelled head 38 and bolt 16 are removable.

To operate the fastening device shown in Figs. 2 and 2a, bolt 16 is pressed downward with a screw-driver, compressing spring 46, whereby locking bar 22 is engaged in groove 20 in the same manner as in the fastening device of Fig. 1. Pressure on bolt 16 is then removed, whereupon spring 46 automatically pushes bolt 16 back toward its original position, locking locking-bar 22 in groove 20. To release locking bar 22, bolt 16 is pressed downward and rotated 90°, as in Fig. 1, and then allowed to return to its original position by spring 46.

Figures 3, 4:
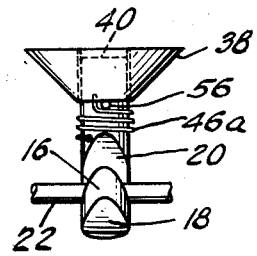
Fig. 3 is an elevational view of a modification of the preferred embodiment shown in Fig. 2.
Fig. 4 is a bottom plan of the coupling as applied to the coupled plates, with the bolt 16 omitted.

The fastening device shown in Fig. 3 is essentially similar in structure and operation to the fastening device shown in Figs. 2 and 2a. The only difference is that spring 46a is externally located with respect to bevelled head 38 and collar 44 is omitted. Spring 46a has one end thereof connected to bevelled head 38 and the other end thereof connected to bolt 16. Pin 56 is provided for limiting the upward movement of bolt 16 relative to bevelled head 38.

Obviously many modifications and variations of the present invention are possible in the light of the above teachings. It is therefore to be understood that within the scope of the appended claims the invention may be practiced otherwise than as specifically described.

I claim:

1. In combination, a plate-like member having a hole, a locking bar, one end of said locking bar being pivotally secured to said plate-like member adjacent the hole for movement about an axis substantially perpendicular to said plate-like member, said locking bar extending transversely relative to its pivot axis and close to and parallel with the adjacent face of said member whereby it is adapted to assume one position where it extends across the hole and another position arcuately spaced therefrom about its pivot axis where it does not extend across the hole, means including stop means and spring means secured to plate-like member adjacent said hole and to the other end of said locking bar for normally retaining said locking bar in said one position, a bolt of slightly smaller diameter than the hole having a head at one end thereof which is movable axially of said bolt and which is of greater dimension than the diameter of the hole, said bolt formed with a transverse groove adjacent its other end extending into said bolt toward its said other end obliquely relative to the axis of said bolt, said other end of said bolt being formed as a cam surface substantially parallel to the transverse groove, said bolt being adapted to removably fasten said plate-like member to another plate-like member having a similar sized hole.

2. The combination defined in claim 1, further including a spring wound around said bolt and having one end engaging said bolt and the other end engaging said head.

3. The combination defined in claim 2, wherein said spring is located within said head and wherein said bolt has a shoulder at said one end thereof for supporting one end of said spring and said head has a shoulder at the forward end thereof for supporting the other end of said spring.

4. A fastening device for attachment of a member to one face of a plate where the other face of said plate is inaccessible for completion of the coupling, and which device has maximum compactness in the direction of the thickness of the plate, comprising said plate with an aperture therethrough, a stud movable endwise and rotatable in said aperture and projecting through and beyond said plate at said inaccessible face, the projecting end of said stud having a notch in a side thereof, which notch extends only part way around said stud leaving an unnotched part of the side of the stud approximately axially aligned with said notch, locking means for said stud having a bar attached at one end to said plate at its inaccessible face and extending therefrom across the open end of said aperture and close to and along said inaccessible face, said bar being resiliently urged into its position transversely across said aperture end and into said notch in said stud when the notch is aligned therewith and facing it, the projecting end of said stud at said inaccessible face being oblique to engage and cam aside said bar as the stud is inserted through said aperture in said plate, said stud and member having cooperating parts by which attachment of the stud to said plate will couple said member to said plate.

5. The device as set forth in claim 4 wherein said member is another plate abutting face to face against said one plate at its accessible side, and said cooperating parts are a shoulder on said stud abutting against said another plate and confining it to said one plate.

6. The device as set forth in claim 4, and means resiliently urging said stud in a direction tending to withdraw it from said plate and thereby maintainng pressure contact between said stud and the bottom of said notch in said bar, and said notch being undercut at its bottom relatively to its open end and preventing rotation of said stud and until the stud has been moved endwise against the action of said resiliently urging means to align the bar transversely with the entrance to said notch.

7. The device as set forth in claim 5, and means resiliently urging said stud in a direction tending to withdraw it from said plate and thereby maintaining pressure contact between said stud and the bottom of said notch in said bar, and said notch being undercut at its bottom relatively to its open end and preventing rotation of said stud until the stud has been moved endwise against the action of said resiliently urging means to align the bar transversely with the entrance to said notch.

8. A fastening device for coupling together two plates abutting face to face, where one exposed face of one plate is inaccessible to complete the coupling, and which has maximum compactness in a direction normal to the faces of the plates, comprising said plates abutting face to face with aligned apertures from face to face of the plates, a stud received in and passing through said apertures, movable endwise and also rotatable in the apertures, and with an end projecting beyond said inaccessible face of said one plate, said projecting end having an end face oblique to the axis of the stud and a notch in the side of the projecting end, which notch extends only partway around said stud leaving an unnotched part of the side of the stud approximately axially aligned with said notch, locking means for said stud having a bar attached at one end to said one plate at its inaccessible face and biased to extend in close proximity and parallel to said inaccessible face across the space occupied by said projecting stud end and bear against a side of said stud when the stud is in said apertures and enter said notch when the notch is facing and aligned with said bar, means cooperating with the outer end of said stud for engaging the other of said plates on its exposed face to confine said other plate to said one plate whereby rotation of said stud in said apertures of said plates while said bar is aligned transversely with the outer open end of said notch will cam said bar out of said notch enabling removal of said stud to uncouple said plates, and said oblique end face of said projecting end of said stud, when the stud is inserted through said plates in said apertures will cam said bar aside until said stud notch is aligned with and faces said bar, enabling the bar under its bias to enter the notch and lock the stud in place.

9. The device as set forth in claim 8, wherein said means cooperating with the outer end of the stud is countersunk approximately flush in the exposed face of said other plate to reduce the overall thickness of the plates and the coupling of the same together.

10. The device as set forth in claim 8, and a spring acting between said cooperating means and said stud and urging said stud in a withdrawal direction to maintain pressure between said bar and a side of said notch.

11. The device as set forth in claim 8, and a spring acting between said cooperating means and said stud and urging said stud in a withdrawal direction to maintain pressure between said bar and a side of said notch, and said notch in said stud being undercut at its bottom relatively to its entrance end and in the direction of the length of said stud in the bottom of which undercut said bar is engaged under the action of said spring on said stud, whereby endwise inward movement of said stud is required before it can be rotated to cam said bar aside and release itself.

12. The device as set forth in claim 8, wherein said means cooperating with the outer end of the stud includes a member surrounding the stud, countersunk approximately flush in the outer face of said other plate and having an internal flange at its inner end, said stud at its outer end has an external shoulder approximately flush with the outer face of said member, and a helical spring surrounding said stud and compressed between said flange and said shoulder.

13. The device as set forth in claim 8, wherein said means cooperating with the outer end of the stud includes a member surrounding the stud, countersunk approximateyl flush in the outer face of said other plate and having an internal flange at its inner end, said stud at its outer end has an external shoulder approximately flush with the outer face of said member, and a helical spring surrounding said stud and compressed between said flange and said shoulder, the outer end of said stud being formed to receive a tool by which the stud may be pressed endwise and rotated to release itself from said bar.

14. The device as set forth in claim 8, wherein said means cooperating with the outer end of the stud includes a member surrounding the stud, countersunk approximately flush in the outer face of said other plate and having an internal flange at its inner end, said stud at its outer end has an external shoulder approximately flush with the outer face of said member, and a helical spring surounding said stud and compressed between said flange and said shoulder, the outer end of said stud being formed to receive a tool by which the stud may be pressed endwise and rotated to release itself from said bar, said notch in the stud being undercut at its bottom relatively to its open end and the length of said stud in which undercut said bar is engaged under the action of said spring on said stud, whereby said endwise movement of said stud is required to move the non-undercut part of said notch into alignment with said bar before the stud can be rotated to cam the bar aside and release itself from said bar for endwise withdrawal from the plates.

15. A fastening device for coupling together two plates in a face to face relation through aligned apertures in the plates, where one outer face of one of the assembled plates is inaccessible to establish the coupling between the plates, which comprises said plates in face to face relation with aligned apertures, a locking bar secured at one end to said one plate on its said inaccessible face and extending therefrom parallel and close to said inaccessible face across said aligned apertures if axially extended, means resiliently urging the free part of said bar into said position across said aligned apertures and yieldingly holding it there, a stud disposed in said aligned apertures, extendng through both of said plates, rotatable about the axis of the apertures and movable endwise axially along the apertures, the end portion of said stud beyond the aperture end in said one plate at said inaccessible face having in one side thereof a notch into which said bar may move to prevent withdrawal of said stud, said notch extending only part way around the circumference of said stud, means by which said stud may be moved endwise in a direction to withdraw it from said aligned apertures at the accessible face when permitted by removal of said bar from said notch in said stud, the extreme end face of said end portion of the stud being oblique to the longitudinal axis of the stud, whereby when the stud is inserted into said apertures, with said oblique end first, the oblique end face of the stud will cam said bar aside and hold it aside until the bar and notch are aligned and the bar can enter the notch to lock the stud against removal from said plates.

16. The device as set forth in claim 8, wherein said notch has both side walls oblique to the axis of the stud and its inner end out of transverse alignment with the end entrance to the notch, and said means cooperating with the outer end of said stud and said stud are relatively movable endwise of the stud to cause endwise movement of the stud in said apertures with camming of the locking bar out of the notch by the oblique side walls during such endwise movement.

17. In combination; a pair of plates to be connected together face to face and having aligned apertures, a thin, rod-like locking bar having a right angular end portion pivoted to one exposed face of one of said plates with its axis of pivoting perpendicular to a face of that plate and with the balance of the bar extending parallel and close to said exposed face; a bolt having a head at one end thereof which is movable axially of said bolt, and also having a transverse groove adjacent its other end and extending into said bolt toward its said other end, with both side walls of the groove oblique relative to the axis of said bolt and generally parallel to one another, said other end of said bolt being formed as a cam surface oblique to the length of the bolt, and operable when the bolt is inserted through the aligned apertures to cam the locking bar aside, a stop pin on said one face of said one plate and spring means connected to said one plate and to said locking bar and urging said bar into a position against said stop, said stop limiting movement of said bar to a position partly across said plate apertures whereby when said bolt is inserted through the apertures in both plates, cam end first, as its cam end moves to project beyond the holes it will force said locking bar by cam action away from across said apertures until it snaps into said groove in said bolt, and locks the bolt against removal until the bolt is first moved endwise to cam the locking bar out of the notch and then rotated to place the unnotched side of the bolt against said bar and enable removal of the bolt.

References Cited in the file of this patent
UNITED STATES PATENTS

| | | |
|---|---|---|
| 2,252,286 | Hathorn | Aug. 12, 1941 |
| 2,526,791 | Wroblewski | Oct. 24, 1950 |

FOREIGN PATENTS

| | | |
|---|---|---|
| 266,964 | Great Britain | Mar. 10, 1927 |
| 538,115 | Great Britain | July 22, 1941 |